(No Model.)
J. J. TONG & J. R. WOOD.
APPARATUS FOR FILTERING OIL.
No. 549,833.  Patented Nov. 12, 1895.
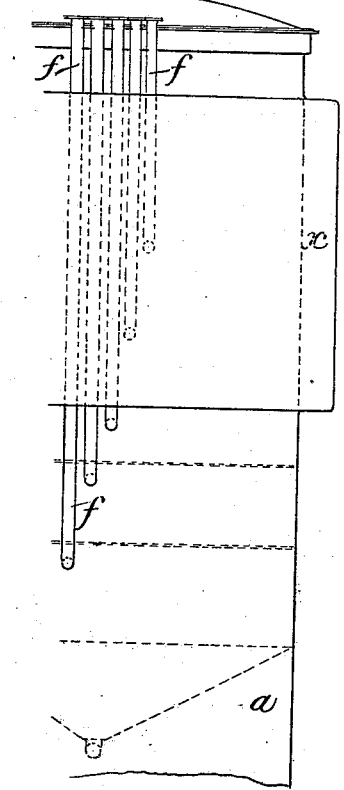
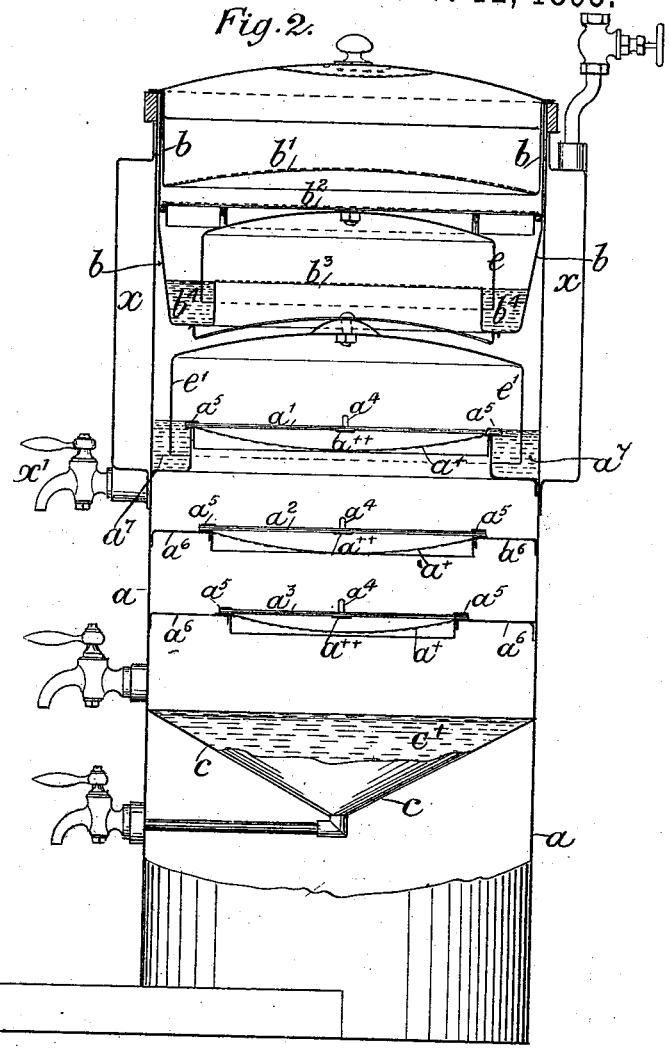
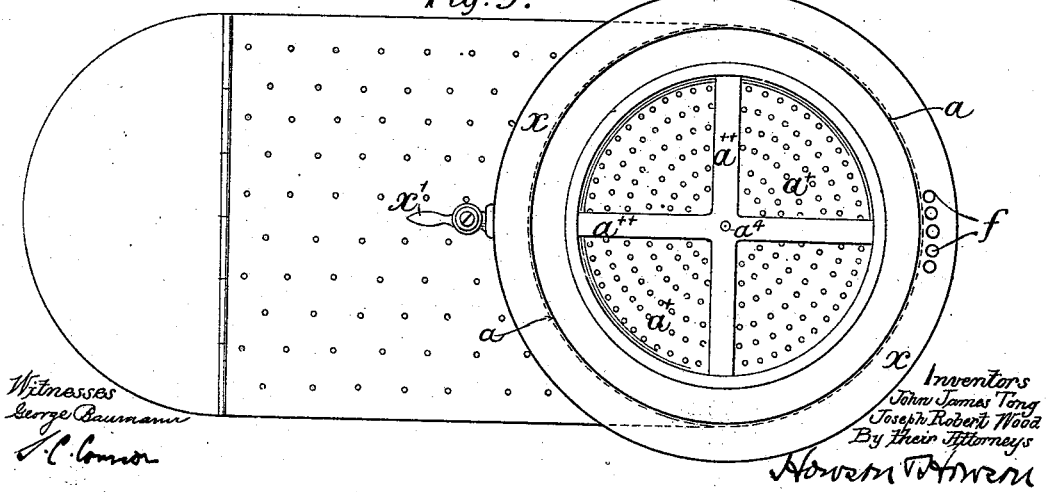
Witnesses
George Baumann
Inventors
John James Tong
Joseph Robert Wood
By their Attorneys

United States Patent Office.

JOHN JAMES TONG AND JOSEPH ROBERT WOOD, OF MANCHESTER, ENGLAND.

APPARATUS FOR FILTERING OIL.

SPECIFICATION forming part of Letters Patent No. 549,833, dated November 12, 1895.

Application filed April 9, 1895. Serial No. 545,095. (No model.)

*To all whom it may concern:*

Be it known that we, JOHN JAMES TONG and JOSEPH ROBERT WOOD, subjects of the Queen of Great Britain and Ireland, residing at Manchester, in the county of Lancaster, England, have invented Improvements in Apparatus for Filtering Oils and the Like, of which the following is a specification.

This invention relates to that kind of apparatus for filtering oils which consists of a removable oil-vessel provided with filtering-sieves and a receiving-vessel with a conical bottom containing water upon which the oil collects; and the object of our invention is to improve the construction of such apparatus.

In order that our invention may be more clearly understood, we have annexed hereto a sheet of drawings illustrative thereof and have marked the same with letters of reference corresponding with those in the following description.

Figure 1 on the annexed drawings is a partial elevation of the apparatus, and Fig. 2 is a sectional elevation of the apparatus. Fig. 3 is a horizontal section through the upper part of the receiving-vessel with the oil-vessel removed. $a$ is the receiving-vessel, $b$ the removable oil-vessel, and $c$ the conical bottom in which the oil collects upon the water. (Shown at $c'$.)

We fix superposed horizontal sieves or strainers $a'\ a^2\ a^3$ in the vessel $a$, between the bottom $c$ thereof and the vessel $b$, in order to still further purify the oil strained in the removable vessel $b$ through the superposed horizontal sieves $b'\ b^2\ b^3$, the said sieves $a'\ a^2\ a^3$ being removable when required for cleaning and other purposes; and instead of providing the removable vessel $b$ with a steam-jacket fitting inside the upper part of the receiving-vessel $a$, we provide the outside of the receiving-vessel $a$ with a steam-jacket $x$, which not only serves to heat the oil passing through the vessel $b$, but also to heat the oil as it passes through a sieve $a'$ (or sieves) fixed in the vessel $a$. A further advantage obtained from this construction is that the steam-jacket being on the outside of the receiving-vessel, in case of bursting the escaping steam and water cannot reach the oil in the vessels $a$ and $b$ and spoil the same. An outlet $x'$ for water of condensation can also be conveniently arranged at the bottom of the steam-jacket $x$, which was not possible when the jacket was arranged around the vessel $b$ inside the vessel $a$.

We make the sieves $a'\ a^2\ a^3$ preferably decreasing in diameter, so that they can be the more readily removed from the top when required, and each sieve is made of a dished or concave piece of perforated metal $a^+$, with a flat cross bar or bars $a^{++}$, (see Fig. 3,) upon which is placed the filtering cloth or fabric $a'\ a^2\ a^3$, kept in place by the central pegs $a^4$, and a clamping-ring $a^5$ upon the edge of the fabric. Thus the fabric is held away from the perforated metal and the oil filters through the fabric more readily and is further broken up by the perforated metal dish. The sieves $a'\ a^2\ a^3$ fit in or upon the annular shelves $a^6$.

We further improve the filtering properties of the apparatus by forming an annular depression or channel $b^4$ around the sieve $b^3$ and a similar depression $a^7$ around one or more of the sieves $a'\ a^2\ a^3$ and providing a bell-cover $e\ e'$ below the upper sieve and with its lower edge dipping into the depression or channel below to guide the oil into these depressions, where it accumulates and will deposit any impurities capable of settling therein before passing through the said sieves $b^3\ a'$, respectively. The bell $e'$, which is suspended from the bottom of the vessel $b$, also prevents the oil-drops from the raised sieve $b^3$ from falling upon the sieve $a'$, which they would otherwise do with such force as possibly to drive impurities through the straining-fabric.

$f\ f$ are a series of air-inlets, each communicating with one of the compartments formed by the sieves or strainers $a'\ a^2\ a^3$, so that the oil can flow or pass freely through them.

Having now particularly described and ascertained the nature of our said invention, we declare that what we claim is—

1. A filter for oils and the like consisting of a receiving vessel provided with removable sieves, in combination with a removable oil filtering vessel provided with a series of sieves or strainers and suspended in the upper part of the receiving vessel, the said receiving vessel being made with an outer steam-space surrounding the above named oil filtering vessel and one or more of the compartments formed by the aforesaid removable sieves, substantially as hereinbefore described.

2. In an oil filtering apparatus, a sieve or strainer comprising a dished or concave perforated plate with a cross bar or cross bars above the concaved side, and a sheet or sheets of filtering fabric supported on the said cross bar or bars, substantially as hereinbefore described.

In testimony whereof we have signed our names to this specification in the presence of two subscribing witnesses.

JOHN JAMES TONG.
JOSEPH ROBERT WOOD.

Witnesses:
CHARLES A. DAVIES,
JNO. HUGHES.